(12) United States Patent
Waible et al.

(10) Patent No.: US 12,145,543 B2
(45) Date of Patent: Nov. 19, 2024

(54) WIPER BLADE AND WIPER DEVICE FOR CLEANING A VEHICLE WINDSCREEN, AND METHOD FOR MOUNTING A WIPER BLADE

(71) Applicant: Valeo Systèmes d'Essuyage, Le Mesnil Saint Denis (FR)

(72) Inventors: Siegfried Waible, Bietigheim-Bissingen (DE); Michael Buss, Bietigheim-Bissingen (DE)

(73) Assignee: Valeo Systemes d'Essuyage, La Verriere (FR)

(*) Notice: Subject to any disclaimer, the term of this patent is extended or adjusted under 35 U.S.C. 154(b) by 0 days.

(21) Appl. No.: 18/262,082

(22) PCT Filed: Jan. 18, 2022

(86) PCT No.: PCT/EP2022/050964
§ 371 (c)(1),
(2) Date: Jul. 19, 2023

(87) PCT Pub. No.: WO2022/157137
PCT Pub. Date: Jul. 28, 2022

(65) Prior Publication Data
US 2024/0300449 A1  Sep. 12, 2024

(30) Foreign Application Priority Data
Jan. 19, 2021  (DE) .................... 10 2021 101 016.0

(51) Int. Cl.
*B60S 1/40*  (2006.01)
*B60S 1/38*  (2006.01)

(52) U.S. Cl.
CPC ........... *B60S 1/4087* (2013.01); *B60S 1/3849* (2013.01); *B60S 1/4083* (2013.01); *B60S 1/3856* (2013.01); *B60S 1/3865* (2013.01)

(58) Field of Classification Search
CPC .... B60S 1/4083; B60S 1/4087; B60S 1/4038; B60S 1/4045; B60S 1/3849; B60S 1/4009; B60S 1/3856
(Continued)

(56) References Cited

U.S. PATENT DOCUMENTS 3,942,212 A * 3/1976 Steger .................... B60S 1/3801
15/250.32
3,961,394 A * 6/1976 Steger .................... B60S 1/4003
15/250.32
(Continued)

FOREIGN PATENT DOCUMENTS

CN  107364428 A  11/2017
CN  111391790 A  7/2020
(Continued)

OTHER PUBLICATIONS

International Search Report issued in International Application No. PCT/EP2022/050964 mailed on Apr. 29, 2022 (4 pages).
(Continued)

*Primary Examiner* — Gary K. Graham
(74) *Attorney, Agent, or Firm* — Valeo Systemes d'Essuyage

(57) ABSTRACT

A wiper blade for cleaning a vehicle windscreen is disclosed. The wiper blade has a wiper blade body which extends along a longitudinal axis, a wiper blade adapter which is connected to the wiper blade body, a first adapter element, connected to the wiper blade body, and a second adapter element, which can be connected to a wiper arm. The two adapter elements are arranged such that they can be pivoted in relation to one another in a direction, running perpendicularly to the longitudinal axis, in an axis of rotation. The wiper blade has a flat construction.

10 Claims, 2 Drawing Sheets

(58) Field of Classification Search
USPC .................................................... 15/250.32
See application file for complete search history.

(56) References Cited

U.S. PATENT DOCUMENTS

| | | | |
|---|---|---|---|
| 4,094,039 A * | 6/1978 | Waterman | B60S 1/4087 |
| | | | 15/250.32 |
| 6,634,056 B1 | 10/2003 | De Block | |
| 11,603,077 B2 | 3/2023 | Seiller | |
| 2010/0107354 A1 | 5/2010 | Verelst et al. | |
| 2010/0154158 A1 | 6/2010 | Boland | |
| 2013/0333144 A1 | 12/2013 | Depondt | |
| 2017/0197592 A1 | 7/2017 | Friscioni | |

FOREIGN PATENT DOCUMENTS

| | | |
|---|---|---|
| DE | 102014114688 A1 | 4/2016 |
| DE | 102015215103 A1 | 2/2017 |
| DE | 202018006747 U1 | 8/2022 |
| JP | 4813719 B2 | 9/2011 |
| JP | 2013545666 A | 12/2013 |

OTHER PUBLICATIONS

Written Opinion issued in International Application No. PCT/EP2022/050964 mailed on Apr. 29, 2022 (7 pages).
Japan Patent Office, Office Action (with English translation) of corresponding Japanese Patent Application No. 2023-543233, posted May 7, 2024.

* cited by examiner

WIPER BLADE AND WIPER DEVICE FOR CLEANING A VEHICLE WINDSCREEN, AND METHOD FOR MOUNTING A WIPER BLADE

TECHNICAL FIELD

The invention relates to a wiper blade and a wiper device for cleaning a vehicle windscreen and to the mounting of a wiper blade on a wiper arm. The wiper blade is distinguished, among other things, by an advantageous embodiment of its wiper blade adapter for mounting on the wiper arm.

PRIOR ART

A wiper blade for cleaning a vehicle windscreen having the features of the preamble of claim 1 is known from the applicant's document DE 10 2014 114 688 A1. The known wiper blade has a wiper blade adapter, which consists of two adapter elements that are connected to one another in an articulated manner and usually such that they cannot be detached by the user. In this respect, the two adapter elements are premounted on the wiper blade body of the wiper blade, with the result that the wiper blade is fastened to a wiper arm by connecting the wiper arm to the adapter element of the wiper blade adapter that is assigned to and/or faces towards the wiper arm. Furthermore, the wiper arm of the wiper device is equipped with a U-shaped cross section at the connecting region to the wiper blade adapter, with the result that the wiper arm covers and/or receives the adapter element assigned to the wiper arm.

DISCLOSURE OF THE INVENTION

The wiper blade according to the invention for cleaning a vehicle windscreen having the features of claim 1 makes it possible to connect the adapter element of the wiper blade adapter that faces towards the wiper arm to the wiper arm without or independently of the adapter element of the wiper blade adapter that is assigned to the wiper blade. In contrast to the prior art, it therefore provides an alternative embodiment of the mounting operation for exchanging a wiper blade on a wiper arm and also the embodiment of the two adapter elements of the wiper blade adapter that can be connected to one another. In particular, the wiper blade according to the invention makes it possible in addition, owing to its specially designed wiper blade adapter, to realize a particularly simple structural design of the wiper arm on the end portion of the wiper arm that can be connected to the wiper blade adapter.

Against the background of the above statements, the invention therefore proposes designing a wiper blade for cleaning a vehicle windscreen in such a way that the second adapter element, which is assigned to the wiper arm, has a receptacle that is designed to receive a cross-sectionally in particular rectangular, at least substantially planar end portion of the wiper arm, that, in an operating position of the wiper blade adapter, the second adapter element is arranged in a cross-sectionally U-shaped depression in the first adapter element, which is assigned to the wiper blade body, and that, in the region of side walls facing towards the second adapter element, the first adapter element has groove-shaped guides for receiving extensions which are arranged on the second adapter element, preferably have a round cross section and are arranged in line with the axis of rotation in the operating position of the wiper blade adapter, wherein the guides in the first adapter element form a first limit stop, running in the direction of the longitudinal axis of the wiper blade body, for the extensions in the operating position of the wiper blade adapter, and wherein a second limit stop, formed in the direction of the longitudinal axis of the wiper blade body counter to the direction of the first limit stop, for the second adapter element is formed by a transverse wall on the first adapter element, against which transverse wall a front side of the second adapter element lies.

Advantageous developments of the wiper blade according to the invention for cleaning a vehicle windscreen are stated in the dependent claims.

In order on the one hand to allow the second adapter element to be mounted on the first adapter element as easily as possible without deforming components of the first adapter element, and on the other hand to be able to form the second limit stop on the first adapter element in the operating position of the wiper blade adapter, it is provided in a preferred design embodiment of the wiper blade that, on the side facing away from the wiper blade body, the guides on the side walls have openings for inserting the extensions of the second adapter element, and that the openings have a first spacing, running in the longitudinal direction, from the transverse wall that is smaller than a second spacing between the first limit stop and the transverse wall.

It is also particularly advantageous if the second adapter element in the region of its front side or the transverse wall is convex at least in certain regions. This minimizes the spacing between the adapter elements in the region of the transverse wall when the two adapter elements are being pivoted in relation to one another, and therefore small rotational angles between the two adapter elements are enabled, without a longitudinal play arising between the two adapter elements. This pivot angle between the two adapter elements is necessary for the wiper blade or its wiper lip always to be able to lie against the vehicle windscreen as it moves along the vehicle windscreen.

With a view to a form-fitting arrangement of the end portion of the wiper arm on the second adapter element, it is provided in addition that the receptacle on the second adapter element has an in particular rectangular internal cross section, which is designed to receive the end portion of the wiper arm in a form-fitting manner. In the mounted state of the wiper device, the form-fitting reception brings about a tilt-free or rigid arrangement between the second adapter element and the end portion of the wiper arm.

To securely arrest the wiper arm on the adapter element in the longitudinal direction of the end portion of the wiper arm, it is provided in addition that latching elements for arresting the end portion of the wiper arm in the direction of the longitudinal axis are formed on the second adapter element.

In an advantageous embodiment of latching elements of this type, it is provided that the latching elements and the extensions on the second adapter element are arranged in the region of elastically deformable regions of the side walls, wherein the extensions and the latching elements are arranged on sides facing away from one another.

An advantageous and cost-effective production of the wiper blade adapter can be achieved in that the two adapter elements consist of plastic and are in the form of injection moulded parts.

The invention furthermore also comprises a wiper device for cleaning a vehicle windscreen, having an above-described wiper blade according to the invention. The wiper device is distinguished by a wiper arm which has an end portion that interacts with the receptacle of the second adapter element, wherein the end portion transitions into an S-shaped portion outside the receptacle and close to the adapter element. Such an embodiment of the wiper device makes possible in particular an especially compactly constructed wiper arm or a wiper device which has an especially small overall height.

In a development of a wiper device of this type, it is provided that the end portion of the wiper arm in the region of the receptacle of the second adapter element has depressions, which interact with latching elements of the second adapter element for the purpose of positioning the end portion in the direction of the longitudinal axis in a form-fitting manner.

Lastly, the invention also comprises a method for mounting a wiper blade on a wiper arm in the case of an above-described wiper device. The mounting method is distinguished in that firstly, the end portion of the wiper arm is inserted into the receptacle of the second adapter element and the end portion of the wiper arm is fixed in the receptacle in the longitudinal direction of the receptacle. Then, the extensions of the second adapter element are aligned in relation to the guides of the first adapter element, wherein the second adapter element is arranged at an oblique angle to the first adapter element, in such a way that the front side of the second adapter element has a larger spacing from the first adapter element than a rear side of the second adapter element does. Then, the extensions of the second adapter element are inserted into the openings in the first adapter element and the extensions are moved along the guides, with a possible reduction in the oblique angle between the adapter elements, until the extensions come to lie against the first limit stop of the guides. Lastly, the two adapter elements are pivoted by reducing the oblique angle, until the front side of the second adapter element comes into operative connection with the transverse wall in the first adapter element, as a result of which the wiper blade is longitudinally fixed on the wiper arm.

Further advantages, features and details of the invention will become apparent from the following description of preferred embodiments of the invention and with reference to the drawings.

BRIEF DESCRIPTION OF THE DRAWINGS

FIG. 4 to

EMBODIMENTS OF THE INVENTION

Identical elements or elements having an identical function are denoted by the same reference numbers in the figures.

Figure 1:
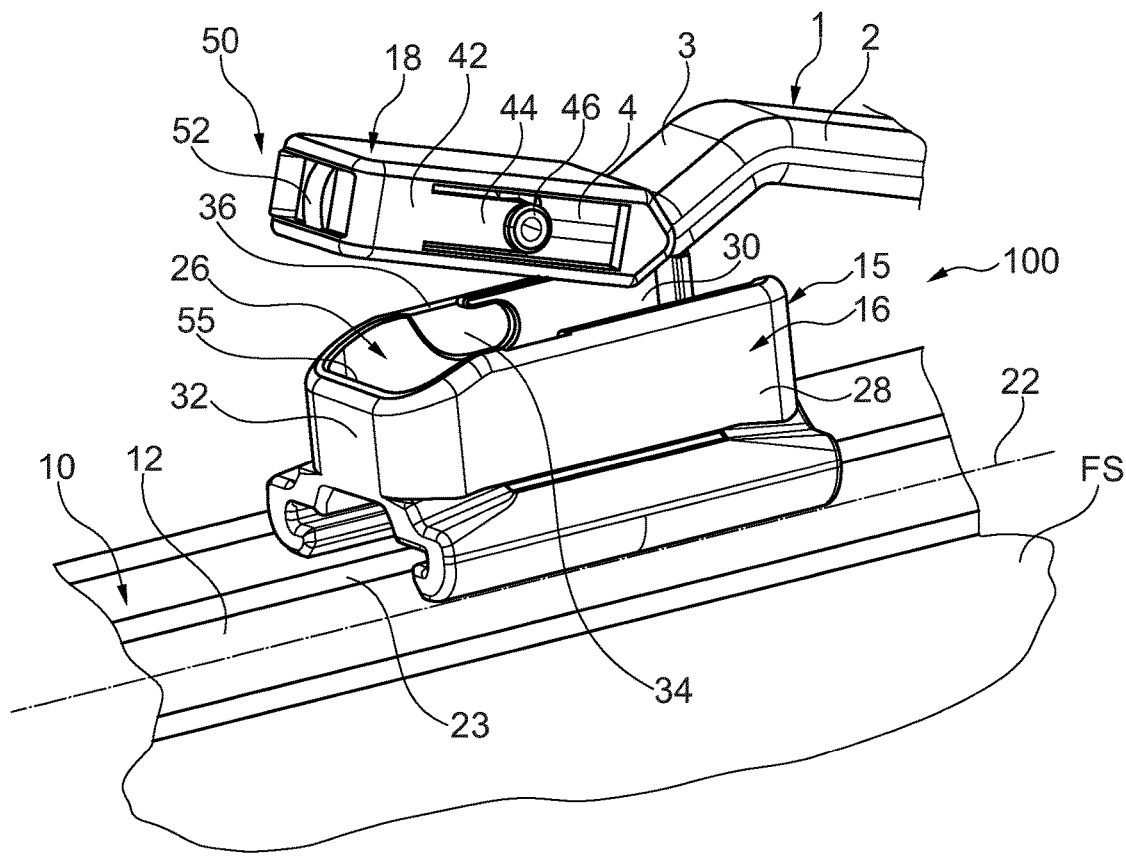
FIG. 1 shows a wiper device for cleaning a vehicle windscreen while a wiper arm is being mounted on a wiper blade.

The wiper device 100 shown in the figures serves to clean a vehicle windscreen FS, illustrated only in certain regions in FIG. 1. The wiper device 100 comprises a wiper arm 1, which has a first wiper arm portion 2 on the side facing away from a wiper blade 10, which is illustrated in a simplified manner in FIG. 1. The first wiper arm portion 2 transitions into an end portion 4 via an S-shaped or oblique connecting portion 3. At least the end portion 4, preferably the entire wiper arm 1, has a rectangular cross section, the end portion 4 running parallel to the first wiper arm portion 2. The end portion 4, which is in the form of a planar end portion 4, on its two opposite longitudinal sides furthermore has a respective depression, running over the entire height of the end portion 4, in the form of a transverse groove 5, 6. In the exemplary embodiment illustrated, the two transverse grooves 5, 6 are arranged approximately in the centre of the end portion 4 with respect to its axial extent.

The wiper blade 10 has a wiper blade body 12, indicated only in FIG. 1, which consists of a resiliently elastic material, and which, for the purpose of cleaning the vehicle windscreen FS, has a wiper lip which lies against the vehicle windscreen FS. The wiper blade 10 has what is known as a flat construction, as is known per se from the prior art. The connection between the wiper blade body 12 and the wiper arm 1 is carried out by means of a wiper blade adapter 15. The wiper blade adapter 15, which consists of plastic and is produced by an injection moulding method, has a first adapter element 16 connected to the wiper blade body 12. The first adapter element 16 can be connected to a second adapter element 18 that can be connected to the end portion 4 of the wiper arm 1, where, in an operating position of the wiper device 100, the two adapter elements 16, 18 are arranged such that they can be pivoted about a certain angle in relation to one another in the region of an axis of rotation 20 (FIG. 7) running perpendicularly to a longitudinal axis 22 of the wiper blade body 12. The pivotable arrangement between the two adapter elements 16, 18 is necessary to enable an optimal support of the wiper blade body 12 on the vehicle windscreen FS to achieve good wiping results when the wiper blade body 12 or the wiper blade 10 is moving along the vehicle windscreen FS, in particular in the case of a curved vehicle windscreen FS.

On the side facing towards the wiper blade body 12, the first adapter element 16 has longitudinal grooves 23, which run parallel to the longitudinal axis 22 of the wiper blade body 12 and in the region of which the wiper blade body 12 is held by the first adapter element 16 via spring rails (not illustrated) arranged in the wiper blade body 12.

Figure 7:
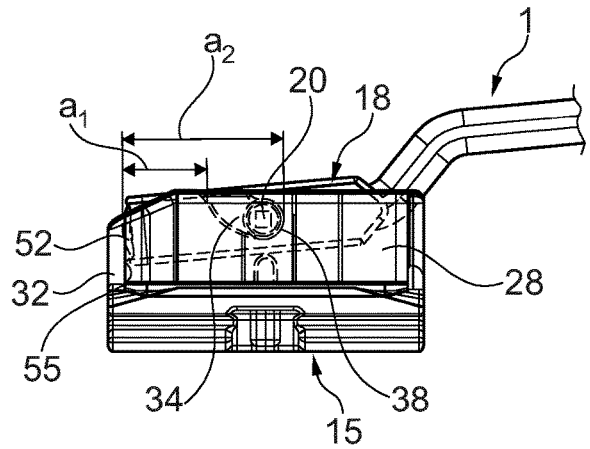
FIG. 7 show, in each case in partially sectional side views, the mounting operation of a wiper blade on a wiper arm of the wiper device during different mounting phases.

The first adapter element 16 has a cross-sectionally U-shaped depression 26 on the side facing towards the second adapter element 18. The depression 26 is delimited by two side walls 28, 30 and a transverse wall 32 delimiting the depression 26 in the longitudinal direction on one side. On their mutually facing inner sides, the two side walls 28, 30 have respective groove-shaped guides 34, which on the top side of the two side walls 28, 30 on the side facing away from the wiper blade body 12 open out in openings 36. The two guides 34, which are arranged symmetrically in relation to a centre plane (not illustrated) of the first adapter element 16, have a substantially sickle-like form and have a first spacing a from the transverse wall 32 as viewed in the direction of the longitudinal axis 22. The ends of the guides 34 that face away from the openings 36 form a first limit stop 38, which runs in the direction of the longitudinal axis 22 and has a spacing $a_2$ from the transverse wall 32, wherein the second spacing $a_2$ is larger than the first spacing $a_1$, as is illustrated in FIG. 7.

Figure 4:
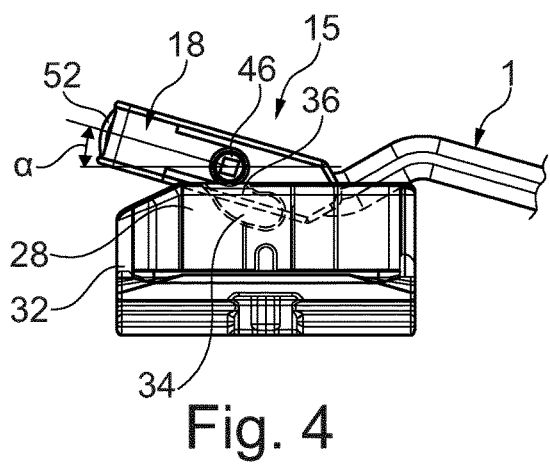
Figure 5:
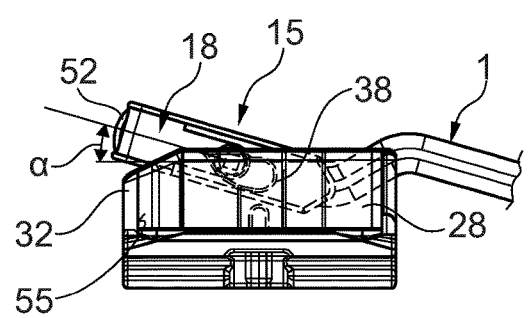

The second adapter element 18 has a sleeve-like form and has an internal cross section for forming a receptacle 40, the cross section of which is matched to the (external) cross section of the end portion 4, in such a way that a form-fitting reception of the end portion 4 in the region of the receptacle 40 is made possible. By way of example, elastic deformable, longitudinally extending webs 44, which have extensions 46 with a circular external cross section integrally moulded monolithically on the end regions thereof, proceed from side walls 42 of the second adapter element 18. As can be seen in particular with reference to FIG. 2, the extensions 46 are not only arranged on the outer side of the respective web 44, but in addition also on the inner side of the webs 44 which faces towards the end portion 4 or the receptacle 40, the extensions 46 there being in the form of latching elements 48. In a state of the second adapter element 18 in which it is mounted on the end portion 4, the latching elements 48 serve to engage with the transverse grooves 5, 6, in order to longitudinally fix the second adapter element 18 in relation to the end portion 4 of the wiper arm 1. By contrast, the extensions 46 serve to interact with the guides 34 of the first adapter element 16 and to form the axis of rotation 20 in an operating position of the wiper blade 10. For this, the extensions 46, which are arranged in line with the axis of rotation 20, have an external cross section which, in the operating position of the wiper blade 10, makes it possible to receive them in the region of the guides 34 without a gap. Furthermore, the second adapter element 18 is delimited on the front side 50, which faces away from the end portion 4, by way of example by a convexly shaped web 52. In the operating position of the wiper blade 10, illustrated in FIG. 4, the web 52 preferably lies against the transverse wall 32 of the first adapter element 16 at least virtually without a gap.

Figure 2:
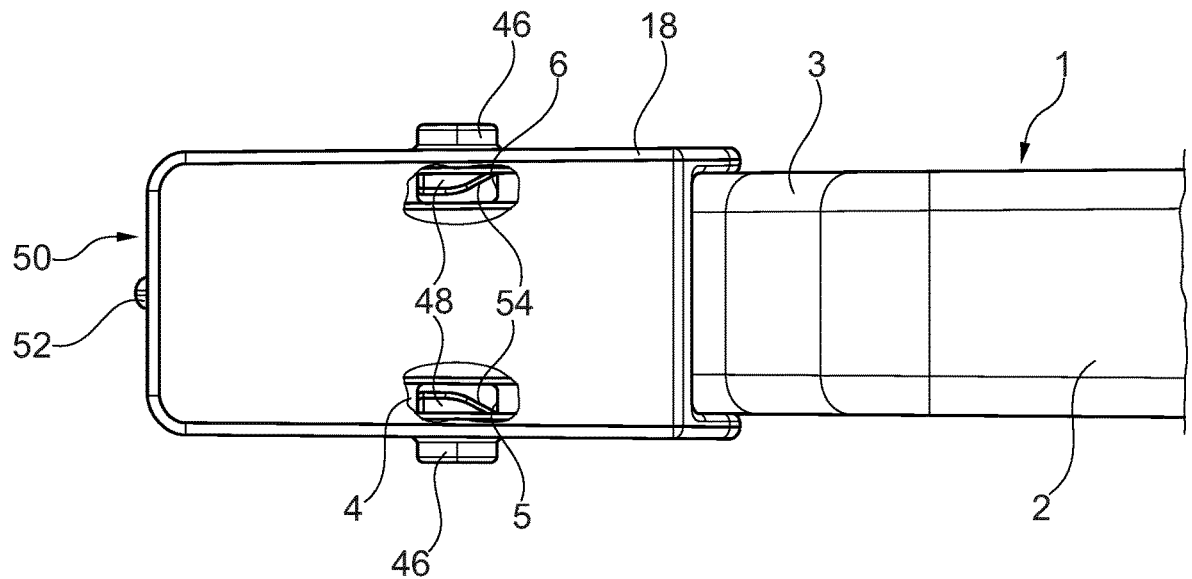
FIG. 2 shows a top view of an end portion of the wiper arm according to FIG. 1 with an adapter element of a wiper blade adapter connected thereto.
Figure 3:
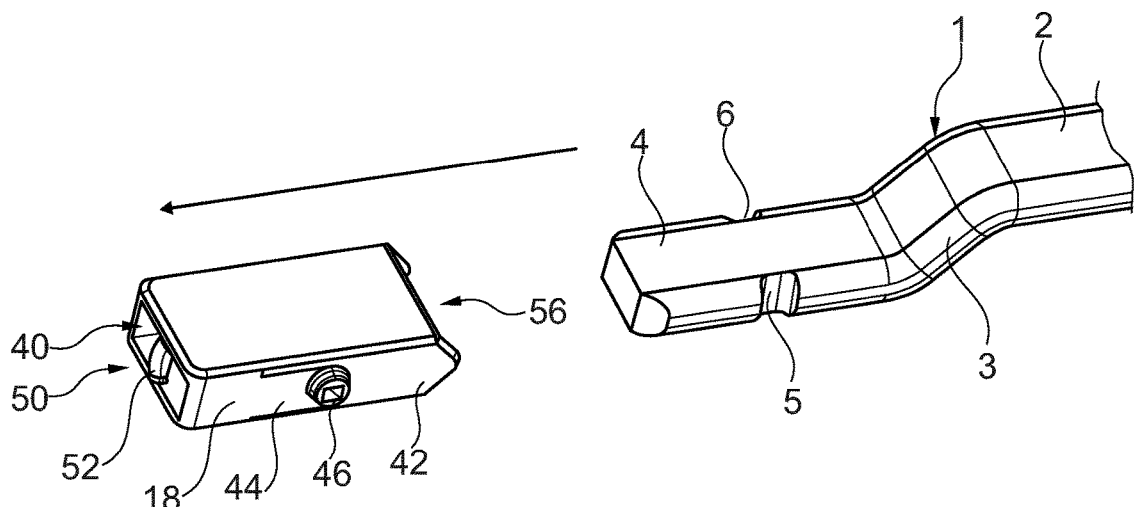
FIG. 3 shows the adapter element and the wiper arm according to FIG. 2 in a perspective illustration on their own.

The wiper device 100 or the wiper blade 10 is mounted on the wiper arm 1 in multiple steps. For this, reference is made first of all to FIG. 3. It can be seen there that a relative movement between the second adapter element 18 and the wiper arm 1 makes it possible to mount the second adapter element 18 on the end portion 4 of the wiper arm 1. In the process, the end portion 4 is inserted into the region of the receptacle 40 of the second adapter element 18. When the end portion 4 is being inserted into the receptacle 40, the latching elements 48, which have a bevel 54, are bent outwards elastically, until the latching elements 48 come into the region of the transverse grooves 5, 6 and there fix the second adapter element 18 longitudinally in relation to the end portion 4. This state is illustrated in FIG. 2.

Figure 6:
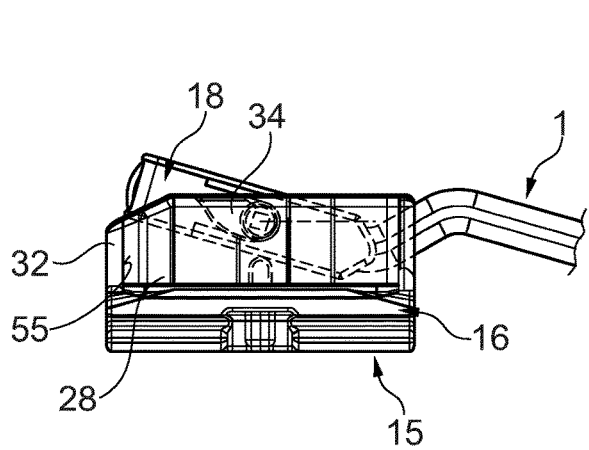

Then, in accordance with the illustration in FIGS. 4 to 7, the wiper device 100 is mounted further, by connecting the second adapter element 18 to the first adapter element 16. Firstly, in accordance with FIG. 4, an oblique angle α is set between the end portion 4 or the second adapter element 18 and the first adapter element 16, the two extensions 46 being positioned above the openings 36 of the guides 34. In the process, the front side 50 of the second adapter element 18 has a larger spacing from the first adapter element 16 than a rear side 56 of the second adapter element 18 does. Then, in accordance with the illustration in FIG. 5, the extensions 46 are inserted into the openings 36 of the guides 34 and the extensions 46 are slid along in the guides 34. In the process, the angle α is maintained or possibly reduced. FIG. 6 illustrates the state in which the extensions 46 have reached their final position within the guides 34, the extensions 46 lying against the first limit stop 38. Then, in accordance with the illustration in FIG. 7, the angle α is reduced, typically to approximately 0°. In the process, the front side 50 of the second adapter element 18 comes into operative connection with the transverse wall 32, which, on the side facing towards the web 52, forms a second limit stop 55, acting counter to the direction of the first limit stop 38, for the second adapter element 18. In addition, it can be seen in FIG. 7 that, in the operating position of the wiper blade 10, the second adapter element 18, substantially apart from its top side, is received without play within the depression 26 of the first adapter element 16 as viewed in the direction of the longitudinal axis 22.

The above-described wiper blade 10 or the wiper device 100 may be altered or modified in a wide variety of ways without departing from the concept of the invention.

REFERENCE SIGNS

1 Wiper arm
2 Wiper arm portion
3 Connecting portion
4 End portion
5 Transverse groove
6 Transverse groove
10 Wiper blade
12 Wiper blade body
15 Wiper blade adapter
16 First adapter element
18 Second adapter element
20 Axis of rotation
22 Longitudinal axis
23 Longitudinal groove
26 Depression
28 Side wall
30 Side wall
32 Transverse wall
34 Groove-shaped guide
36 Opening
38 First limit stop
40 Receptacle
42 Side wall
44 Web
46 Extension
48 Latching element
50 Front side
52 Web
54 Bevel
55 Second limit stop
56 Rear side
$a_1$ Spacing
$a_2$ Spacing
FS Vehicle windscreen
100 Wiper device
α Angle

The invention claimed is:
1. A wiper blade for cleaning a vehicle windscreen, comprising:
a wiper blade body which extends along a longitudinal axis;
a wiper blade adapter which is connected to the wiper blade body and has a first adapter element, connected to the wiper blade body, and a second adapter element, which can be connected to a wiper arm,
wherein the two adapter elements are arranged configured to be pivoted in relation to one another in a direction, running perpendicularly to the longitudinal axis, on an axis of rotation,
wherein the wiper blade has a flat construction,
wherein the second adapter element has a receptacle configured to receive a cross-sectionally rectangular at least substantially planar end portion of the wiper arm, wherein in an operating position of the wiper blade adapter, the second adapter element is arranged in a cross-sectionally U-shaped depression in the first adapter element, and in a region of side walls facing towards the second adapter element, the first adapter element has groove-shaped guides for receiving extensions which are arranged on the second adapter element, said extension have a round cross section and are arranged in line with the axis of rotation in the operating position of the wiper blade adapter, wherein the guides form a first limit stop, running in a direction of the longitudinal axis, for the extensions in the operating position of the wiper blade adapter, and wherein a second limit stop, formed in the direction of the longitudinal axis counter to the direction of the first limit stop, for the second adapter element is formed by a transverse wall, which longitudinally delimits the depression and against which the second adapter element lies in a region of a front side thereof.

2. The wiper blade according to claim 1, wherein, on a side facing away from the wiper blade body, the guides on the side walls have openings for inserting the extensions, and wherein the openings have a first spacing from the transverse wall that is smaller than a second spacing between the first limit stop and the transverse wall.

3. The wiper blade according to claim 1, wherein the second adapter element in the region of the front side or the transverse wall is convex at least in certain regions.

4. The wiper blade according to claim 1, wherein the receptacle in the second adapter element has a rectangular internal cross section, which is configured to receive the end portion of the wiper arm in a form-fitting manner.

5. The wiper blade according to claim 1, wherein latching elements for arresting the end portion of the wiper arm in the direction of the longitudinal axis are formed on the second adapter element.

6. The wiper blade according to claim 5, wherein the latching elements and the extensions are arranged in a region of elastically deformable regions of the side walls, wherein the extensions and the latching elements are arranged on sides facing away from one another.

7. The wiper blade according to claim 1, wherein the two adapter elements consist of plastic and are in the form of injection moulded parts.

8. A wiper device for cleaning a vehicle windscreen, comprising:
    a wiper blade as claimed in claim 1; and
    a wiper arm which has an end portion that interacts with the receptacle of the second adapter element,
    wherein the end portion transitions into an S-shaped connecting portion outside the receptacle and close to the wiper blade adapter element.

9. The wiper device according to claim 8, wherein the end portion in a region of a receptacle of the second adapter element has depressions, which interact with latching elements of the second adapter element for positioning the end portion in the direction of the longitudinal axis in a form-fitting manner.

10. A method for mounting a wiper blade on a wiper arm in a wiper device as claimed in claim 8, comprising:
    inserting the end portion of the wiper arm into the receptacle of the second adapter element and fixing the end portion in the receptacle in the longitudinal direction of the receptacle;
    aligning the extensions of the second adapter element in relation to the guides of the first adapter element, wherein the second adapter element is arranged at an oblique angle (a) to the first adapter element so that the front side of the second adapter element has a larger spacing from the first adapter element than a rear side of the second adapter element;
    inserting the extensions of the second adapter element into openings in the first adapter element and moving the extensions along the guides, with maintenance of or reduction in the oblique angle (a) between the adapter elements, until the extensions come to lie against the first limit stop of the guides; and
    pivoting the two adapter elements by reducing the oblique angle (a), until the front side of the second adapter element comes into operative connection with the transverse wall in the first adapter element.

* * * * *